United States Patent Office 3,631,111

Patented Dec. 28, 1971

1

2

3,631,111
OXO PROCESS

Edmond R. Tucci, Murrysville, Pa., assignor to Gulf Research & Development Company, Pittsburgh, Pa.

No Drawing. Filed Dec. 17, 1968, Ser. No. 784,479
Int. Cl. C07c 45/10
U.S. Cl. 260—604 HF 17 Claims

ABSTRACT OF THE DISCLOSURE

An Oxo process wherein an olefin is reacted with hydrogen and carbon monoxide in the presence of a catalyst system wherein the major portion thereof is a Group VI–B metal carbonyl complexed with a compound of trivalent phosphorus, trivalent arsenic or trivalent antimony and a minor portion thereof is a metal hydro carbonyl wherein the metal can be cobalt, rhodium, iridium, palladium, iron, nickel, ruthenium, osmium, manganese or rhenium.

This invention relates to an Oxo process, or hydroformylation reaction, wherein hydrogen and carbon monoxide are added to an olefinic compound in the presence of a catalyst to obtain a mixture predominating in an alcohol having one more carbon than said olefinic compound.

I have found that a catalyst composed of a Group VI–B metal carbonyl complexed with a compound of an element of Group V–A, for example, phosphorus, as defined in U.S. Pat. No. 3,117,983 to Matthews, can be employed in the Oxo process to convert the olefinic compound to aldehydes and/or alcohols having one more carbon than said olefinic compound. Although the linearity of the olefinic compound in its progress toward the corresponding aldehydes and/or alcohols is not appreciably disturbed, the reaction requires an undesirably high temperature and even then the conversion of olefinic compounds to corresponding aldehydes and/or alcohols is lower than would be commercially desirable.

I have found that the above process can be improved, that is, the conversion of olefinic compounds can be appreciably increased and the reaction temperature can be appreciably increased and the reaction temperature can be appreciably decreased, without adversely affecting the linearity of aldehyde and/or alcohols produced, by carrying out the process not only in the presence of the catalyst composed of Group VI–B metal carbonyl complexed with a compound of an element of Group V–A as defined above, but additionally in the presence of a minor amount, relative thereto, of a metal hydro carbonyl wherein the metal portion thereof can be cobalt, rhodium, iridium, palladium, iron, nickel, ruthenium osmium, manganese or rhenium.

The principal component of the catalyst system can be defined, for example, by the following structural formula:

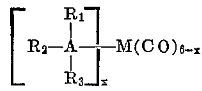

wherein $R_1$, $R_2$ and $R_3$, the same or different, can be hydrogen; a halogen (chlorine, fluorine, bromine or iodine); an alkyl group having from one to 16 carbon atoms, preferably from one to eight carbon atoms, such as methyl, ethyl, n-propyl, n-butyl, n-pentyl, n-hexyl, n-heptyl, n-octyl, n-decyl, n-dodecyl, n-tetradecyl, n-hexadecyl, isopropyl, 2-methylbutyl, 2-ethylpentyl, 3-butylhexyl, 4-pentyldecyl, 2,2′-dimethyldecyl, 3-methyl-4-ethyldecyl, 5-propylhexyl, 3-methyldodecyl, 6-ethyldodecyl, 3,3′-dimethyltetradecyl, 2-butylhexadecyl, etc.; an alkoxy group having from one to 16 carbon atoms, preferably oxy n-propoxy, n-butoxy, n-pentoxy, n-hexoxy, n-heptoxy, n-octoxy, n-decoxy, n-dodecoxy, n-tetradecoxy, n-hexadecoxy, isopropoxy, 2-methylbutoxy, 2-ethylpentoxy, 3-butylhexoxy, 4-pentyldecoxy, 2,2′-dimethyldecoxy, 3-methyl-4-ethyldecoxy, 5-propylhexoxy, 3-methyldodecoxy, 6-ethyldodecoxy, 3,3′-dimethyltetradecoxy, 2-butylhexadecoxy, etc.; or an aryl group having from six to 12 carbon atoms preferably from six to eight carbon atoms, such as phenyl, tolyl, xylyl, 1,3,5-trimethylphenyl, ethylphenyl, propylphenyl, butylphenyl, hexylphenyl, etc. In all cases, however, only one of $R_1$, $R_2$ or $R_3$ can be hydrogen or halogen in any specific complex. "A" can be trivalent phosphorus, trivalent arsenic or trivalent antimony; M can be a Group VI–B metal, that is, chromium, molybdenum or tungsten, and $x$ is an integer from 1 to 5, preferably from 1 to 2. Specific examples of complexes that fall within the above definition include trimethylphosphine chromium pentacarbonyl, triethylphosphine chromium pentacarbonyl, tributylphosphine chromium pentacarbonyl, trioctylphosphine chromium pentacarbonyl, trihexadecylphosphine chromium pentacarbonyl, bis(trimethylphosphine) chromium tetracarbonyl, bis(tributylphosphine) chromium tetracarbonyl, bis(trihexadecylphosphine) chromium tetracarbonyl, penta(trimethylphosphine) chromium carbonyl, penta(tributylphosphine) chromium carbonyl, penta(trihexadecylphosphine) chromium carbonyl, triphenylphosphine chromium pentacarbonyl, bis(triphenylphosphine) chromium tetracarbonyl, penta(triphenylphosphine) chromium carbonyl, trimethylphosphite chromium pentacarbonyl, trihexadecylphosphite chromium pentacarbonyl, bis(trimethylphosphite) chromium tetracarbonyl, bis(trihexadecylphosphite) chromium tetracarbonyl, penta(trimethylphosphite) chromium carbonyl, penta(trihexadecylphosphite) chromium carbonyl, dimethylhydridophosphine chromium pentacarbonyl, dibutylhydridophosphine chromium pentacarbonyl, dihexadecylhydridophosphine chromium pentacarbonyl, bis(dimethylhydridophosphine) chromium tetracarbonyl, bis(dibutylhydridophosphine) chromium tetracarbonyl, bis(dihexadecylhydridophosphine) chromium tetracarbonyl, penta-(dihexadecylhydridophosphine) chromium carbonyl, dimethylchlorophosphine chromium pentacarbonyl, dibutylchlorophosphine chromium pentacarbonyl, dihexadecylchlorophosphine chromium pentacarbonyl, bis(dimethylchlorophosphine) chromium tetracarbonyl, bis(dibutylchlorophosphine) chromium tetracarbonyl, bis(dihexadecylchlorophosphine) chromium tetracarbonyl, penta (dimethylchlorophosphine) chromium carbonyl, penta(dihexadecylchlorophosphine) chromium carbonyl, etc. Also included as specific compounds are the identical compounds defined above but wherein chromium is replaced with molybdenum or tungsten and/or chlorine is replaced with fluorine, bromine or iodine. For simplicity, the principal component of the catalyst system will be referred to herein as the "major catalyst component."

The minor catalyst component, hereinafter referred to as the "co-catalyst" can be defined by the following structural formula:

$$HNB_y$$

wherein N can be the metal cobalt, rhodium, iridium, palladium, iron, nickel, ruthenium, osmium, manganese or rhenium and B is a ligand, that is, a substituent or compound containing an element with an electron pair that can form a coordination compound with said N, and $y$ is an integer from 0 to 6, preferably from 0 to 4. Examples of ligands that can be employed herein include carbon monoxide, trialkyl amines and organic compounds of Group V–A defined by the following structural formula:

$$R_2-\underset{\displaystyle R_3}{\overset{\displaystyle R_1}{\overset{|}{\underset{|}{A}}}}$$

wherein A, $R_1$, $R_2$ and $R_3$ are as defined hereinabove. Trialkyl amine ligands are those having a $pK_a$ acidity of at least about +8 but no greater than +15, preferably a $pK_a$ acidity of about +10 to about +13. By "$pK_a$" acidity I mean to refer to the negative logarithm of the Bronsted acid dissociation constant. Weak bases have low $pK_a$ acidities, while strong bases have high $pK_a$ values. By "trialkyl amines" I intend to include those trialkyl amines whose individual alkyl substituents will have from one to 16 carbon atoms, preferably from about one to 12 carbon atoms, as well as those whose alkyl substituents carry one or more aldehydic, alcoholic, chlorine, fluorine, naphthyl or phenyl substituents thereon. Each of the individual alkyl substituents attached to the nitrogen atom of the amine, moreover, does not have to be similar to another substituent on the same amine. Specific amines that can be employed herein include trimethylamine,
tri-n-butylamine,
tri-n-hexylamine,
tri-n-dodecylamine,
tri-n-hexadecylamine,
tribenzylamine,
N,N-dimethylbenzylamine,
N,N-dimethylnaphthylamine,
N,N-methylbutylbenzylamine,
N,N-butylethylbenzylamine,
N,N-diethyldodecylamine,
2,2',2''-iminotriethanol,
2,2',2''-iminotriethylchloride,
4,4',4''-iminotributylchloride,
1,1',1''-iminotrimethylfluoride,
4,4',4''-iminotributyraldehyde,
7,7',7''-iminotriheptaldehyde, etc.

Specific metal hydrocarbonyl co-catalysts that can be employed herein include hydridocobalt tetra(carbonyl),
hydridocobalttriphenylphosphine tris(carbonyl),
hydridocobalttributylphosphine tris(carbonyl),
hydridocobalttriphenylphosphite tris(carbonyl),
hydridocobalt tris(trifluorophosphorus)carbonyl,
hydridocobalttributylamine tris(carbonyl),
di(hydrido)iron tetra(carbonyl),
hydridoironcyclopentadienyl di(carbonyl),
hydridoiridium tetra(carbonyl),
hydridoiridium tris(triphenylphosphine)carbonyl,
hydridorhodium tetra(carbonyl),
hydridorhodium tris(triphenylphosphine)carbonyl,
hydridoosmium bromo tris(triphenylphosphine)carbonyl,
di(hydrido)osmium tetra(carbonyl),
di(hydrido)ruthenium tetra(carbonyl),
hydridoruthenium chloro tris(diethylphenylphosphine) carbonyl,
hydridorhenium penta(carbonyl),
tris(hydridorhenium)dodeca(carbonyl),
hydridomanganese penta(carbonyl),
hydridomanganese triphenylphosphine tetra(carbonyl),
di(hydridonickel)hexa(carbonyl)),
hydridorhodium tris(triphenylarsine)carbonyl,
hydridorhodium tris(triphenylstibine)carbonyl),
hydridocobalttriphenylarsine tris(carbonyl),
hydridocobalttriphenylstibine tris(carbonyl),
hydridocobalttrihexadecylamine tris(carbonyl),
di(hydrido)tetra(palladium), etc.

Also included as specific compounds are the identical compounds identified above but wherein phosphorus is replaced with arsenic or antimony.

Although I am not sure, I am of the opinion that the results obtained herein can be explained by the following, using chromium pentacarbonyl tributyl phosphine, $Cr(CO)_5(PBu_3)$, as the major catalyst and cobalt hydrocarbonyl $HCo(CO)_4$ as the co-catalyst, as representative. $Cr(CO)_5(PBu_3)$ will probably not function as a catalyst unless it is first converted to $HCr(CO)_4(PBu_3)$ or similarly related metal hydro carbonyls. Such conversion requires high temperature, high pressure and the presence of hydrogen, for example:

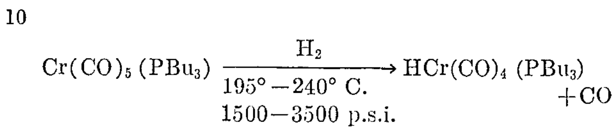

$$Cr(CO)_5(PBu_3) \xrightarrow[195°-240° C.,\ 1500-3500\ p.s.i.]{H_2} HCr(CO)_4(PBu_3) + CO$$

However, even under such conditions, which can exist in the Oxo reactor, only a small amount of the desired conversion results. Consequently only a relatively small amount of conversion of olefinic compounds to aldehydes and/or alcohols is obtained. I am of the opinion that the presence of a small amount of the defined co-catalyst unexpectedly accelerates the conversion of $Cr(CO)_5(PBu_3)$ substantially solely to the desired $HCr(CO)_4(PBu_3)$ or similarly related metal hydrocarbonyls and fortuitously at lower temperatures. Accordingly, when the Oxo reaction is carried out in the presence of both materials, the desired catalyst is quickly and almost completely formed and the conversion of olefin to desired aldehydes and/or alcohols is substantially increased. Beneficially, the linearity of the compounds obtained is not adversely affected to any appreciable extent by the presence of the co-catalyst. This is extremely attractive when normal alpha olefins are employed as charge and linear aldehydes and/or linear alcohols are desired.

Olefinic compounds that can be employed herein include those olefins having from three to 30 carbon atoms, preferably from three to 16 carbon atoms, such as propene, 1-butene, 2-butene, 1-pentene, 2-pentene, 1-hexene, 3-hexene, 1-heptene, 1-octene, 4-octene, 1-dodecene, 1-hexadecene, 1-eicosene, 1-tetracosene, 1-triacontene, 4-methyl-1-pentene, 2,4,4-trimethyl-1-pentene, 4-methyl-2-pentene, 2,6-dimethyl-3-heptene, cyclopentene, cyclohexene, cycloheptene, cyclooctene, 4-methyl-1-cyclohexene, etc. The molar ratio of hydrogen to carbon monoxide can be from 5:1 to about 0.5:1, preferably about 1:1 to about 2:1. The amount of hydrogen and carbon monoxide is that amount stoichiometrically required for addition to the olefinic compound and to aldehyde, when the latter is converted to the corresponding alcohol, although from about one and one-half to about three times the amount stoichiometrically required can be employed. Although a solvent is not required, since the olefinic compound can, in some cases, function as a solvent, the reaction is preferably carried out in a solvent inert to the reactants and reaction product, examples of which are benzene, xylene, heptane, decane, hexadecane, naphtha, diglyme, dodecanol, cyclohexanone, di(benzyl)ether, di(hexyl)ether, etc. Solvent to olefin weight ratio can be from about 0.1:1 to about 20:1, preferably from about 0.5:1 to about 2:1. The major catalyst component relative to the charge (solvent plus olefin) can be from about 0.5 to about 15 weight percent, preferably from about three to about five weight percent. The co-catalyst relative to the charge (solvent plus olefin) can be from about 0.01 to about three weight percent, preferably about 0.1 to about 0.2 weight percent. Stated another way the ratio of major catalyst component to co-catalyst, on a weight basis, can be from about 0.2:1 to about 1500:1, preferably from about 15:1 to about 50:1.

In carrying out the reaction, for example, the olefinic compound and the inert solvent employed can be added to the reaction system, separately or together, or in any order. To this are added the catalysts defined above. The system is pressured with hydrogen and carbon monoxide to a total pressure of about 500 to about 5000 pounds per square inch gauge, preferably about 1500 to about 3500 pounds per square inch gauge and maintained at a temperature of about 350° to about 500° F., preferably about 390° to about 460° F., for about 30 minutes to about 300 minutes, preferably about 90 minutes to about 120 minutes. The reaction product is cooled to room temperature and depressured to atmospheric pressure to flash off gaseous products therein, for example, unreacted hydrogen and/or carbon monoxide and then subjected to distillation conditions, for example, a temperature in the range of about 100° to about 500° F. Aldehydes and alcohols, are thus removed sequentially from the distillation zone. Dissolved in the solvent, which can be the solvent originally present in the charge or a polymer that may have formed during the Oxo process, are the major catalyst component and the co-catalyst, for neither the Oxo reaction conditions nor the recovery process adversely affects either. Preferably the catalysts are recycled to the reaction zone. In the event B, as defined above, is not present in the co-catalyst, the latter may decompose upon depressuring and/or during the recovery procedures. If desired, the resulting catalyst system still containing the undecomposed major catalyst component and the decomposed co-catalyst can be recycled to the reaction system, for under the conditions existing in the Oxo reaction zone carbon monoxide present in the reaction zone will serve as ligand and will form a desirable co-catalyst with the decomposed portions of the co-catalyst. Alternatively, other ligands defined by B can be employed to form a new co-catalyst for reuse in the Oxo reaction zone. Thus, the decomposed co-catalyst and the new ligand will combine under the Oxo reaction conditions to form a new co-catalyst suitable for use therein. Depending on the conditions employed during the reaction about 10 to about 100 percent by weight of the olefinic compound is converted, preferably about 80 to about 90 percent by weight, and of that converted about two to about 40 mol percent is aldehyde and about 60 to about 98 mol percent is alcohol. When aldehydes are the desired product, such as in the hydroformylation of propene, it is preferable to maximize aldehyde formation, whereas in the hydroformylation of higher olefins where the preferred product might be alcohols, the formation of alcohols is maximized.

The invention herein can further be understood by reference to the following. In a series of runs there was added to a synthesis gas (hydrogen and carbon monoxide) flushed one-liter autoclave normal decane solvent, olefin, catalyst and/or co-catalyst and trialkylamine, when used. The autoclave was then brought to an elevated pressure with hydrogen and carbon monoxide and heated to reaction temperature. At the latter temperature, the autoclave was repressured, if necessary, with additional hydrogen and carbon monoxide to reaction pressure. The autoclave was maintained at reaction temperature and reaction pressure, by addition of hydrogen and carbon monoxide, for a defined period, after which the autoclave was cooled, depressured to atmospheric pressure and the contents analyzed by chromatographic analysis. The $HCo(CO)_4$ was not added as such but as the cobalt salt of 2-ethylhexanoic acid. The latter was converted to the former under the conditions existing in the Oxo reactor. The trialkylamine was used to reduce even further the formation of products such as formate esters, acetals, hemiacetals, esters, etc. Thermal decomposition studies of the catalyst systems indicated they did not undergo decomposition and were suitable for reuse in the Oxo reaction. The results obtained are tabulated below in Tables I, II and III wherein chromium, molybdenum and tungsten-containing catalyst, respectively, were employed.

TABLE I

| Run Number | 1 | 2 | 3 | 4 | 5 | 6 | 7 | 8 | 9 | 10 | 11 | 12 | 13 |
|---|---|---|---|---|---|---|---|---|---|---|---|---|---|
| Temperature, ° F. | 455 | 400 | 383 | 400 | 400 | 400 | 400 | 400 | 400 | 400 | 400 | 400 | 400 |
| Pressure, p.s.i.g. | 3,500 | 3,500 | 3,500 | 500 | 1,000 | 2,000 | 3,500 | 3,500 | 3,500 | 3,500 | 3,500 | 3,500 | 3,500 |
| $H_2/CO$ molar ratio | 1.2 | 12. | 1.2 | 1.2 | 1.2 | 1.2 | 0.5 | 2.0 | 4.0 | 1.2 | 1.2 | 1.2 | 1.2 |
| Residence time, minutes | 240 | 240 | 240 | 240 | 240 | 240 | 240 | 240 | 240 | 120 | 60 | 240 | 240 |
| Solvent/olefin weight percent ratio | 0.54 | 0.54 | 0.54 | 0.54 | 0.54 | 0.54 | 5.3 | 5.3 | 5.3 | 0.54 | 0.54 | 1.1 | 2.2 |
| $Cr(CO)_5(PBu_3)$, grams | 7.9 | 7.9 | 7. | 7.9 | 7.9 | 7.9 | 7.9 | 7.9 | 7.9 | 7.9 | 7.9 | 7.9 | 7.9 |
| $HCo(CO)_4$, grams | 0.13 | 0.13 | 0.13 | 0.13 | 0.13 | 0.13 | 0.13 | 0.13 | 0.13 | 0.13 | 0.13 | 0.13 | 0.13 |
| Tri-n-hexyl amine, grams | [1] | [1] | [1] | [1] | [1] | [1] | [1] | [1] | [1] | [1] | [1] | [1] | [1] |
| 1-Hexene, grams [2] | 134 | 134 | 134 | 134 | 134 | 134 | 34 | 34 | 34 | 134 | 134 | 100 | 67 |
| n-Decane, grams | 73 | 73 | 73 | 73 | 73 | 73 | 181 | 181 | 181 | 73 | 73 | 109 | 145 |
| Total linear product, mol percent | 75 | 81 | 83 | 66 | 76 | 80 | 79 | 83 | 85 | 82 | 84 | 83 | 81 |
| Linear alcohol, mol percent | 64 | 56 | 44 | 51 | 60 | 59 | 55 | 62 | 56 | 41 | 28 | 60 | 55 |
| Linear aldehyde, mol percent | 0.9 | 15 | 27 | 9 | 6 | 12 | 17 | 4 | 2 | 30 | 42 | 14 | 14 |
| Olefin conversion, mol percent | 100 | 91 | 76 | 39 | 72 | 84 | 87 | 94 | 97 | 66 | 44 | 89 | 87 |

| Run Number | 14 | 15 | 16 | 17 | 18 | 19 | 20 | 21 | 22 | 23 | 24 | 25 |
|---|---|---|---|---|---|---|---|---|---|---|---|---|
| Temperature, ° F. | 400 | 400 | 400 | 400 | 400 | 428 | 400 | 400 | 400 | 400 | 410 | 410 |
| Pressure, p.s.i.g. | 3,500 | 3,500 | 3,500 | 3,500 | 3,500 | 3,500 | 3,500 | 3,500 | 3,500 | 2,000 | 3,500 | 1,500 |
| $H_2/CO$ molar ratio | 1.2 | 1.2 | 1.2 | 1.2 | 1.2 | 1.2 | 1.2 | 1.2 | 1.2 | 1.2 | 1.2 | 1.2 |
| Residence time, minutes | 240 | 240 | 240 | 240 | 240 | 240 | 240 | 240 | 240 | 120 | 120 | 120 |
| Solvent/olefin weight percent ratio | 0.54 | 0.54 | 0.54 | 0.54 | 0.54 | 2.5 | 0.54 | 0.54 | 0.54 | 2.2 | 1.98 | 2.2 |
| $Cr(CO)_5(PBu_3)$, grams | 15.8 | 3.9 | 1.9 | 0.9 | 0 | 6.0 | 7.9 | 7.9 | 7.9 | 7.9 | 7.9 | 7,9 |
| $HCo(CO)_4$, grams | 0.13 | 0.13 | 0.13 | 0.13 | 0.13 | [1] | 0.03 | 0.06 | 0.26 | 0.37 | 0.37 | 0.37 |
| Tri-n-hexyl amine, grams | [1] | [1] | [1] | [1] | [1] | [1] | [1] | [1] | [1] | 6.9 | 6.9 | 6.9 |
| 1-Hexene, grams [2] | 134 | 134 | 134 | 134 | 134 | 100 | 134 | 134 | 134 | 49 | 55 | 50 |
| n-Decane, grams | 73 | 73 | 73 | 73 | 73 | 250 | 73 | 73 | 73 | 109 | 109 | 109 |
| Total linear product, mol percent | 84 | 76 | 66 | 57 | 58 | 85 | 82 | 80 | 79 | 83 | 85 | 82 |
| Linear alcohol, mol percent | 54 | 50 | 48 | 46 | 41 | 56 | 32 | 47 | 63 | 81 | 82 | 81 |
| Linear aldehyde, mol percent | 18 | 18 | 13 | 7 | 12 | 29 | 38 | 23 | 7 | 3 | 3 | 0.8 |
| Olefin conversion, mol percent | 80 | 92 | 96 | 100 | 100 | 58 | 59 | 87 | 97 | 81 | 80 | 82 |

[1] None. [2] Propene used in Runs Nos. 23, 24 and 25.

TABLE II

| Run Number | 26 | 27 | 28 | 29 | 30 | 31 | 32 | 33 | 34 | 35 | 36 | 37 | 38 | 39 | 40 |
|---|---|---|---|---|---|---|---|---|---|---|---|---|---|---|---|
| Temperature, ° F | 455 | 400 | 383 | 400 | 400 | 400 | 400 | 400 | 400 | 400 | 400 | 400 | 400 | 400 | 400 |
| Pressure, p.s.i.g | 3,500 | 3,500 | 3,500 | 2,000 | 3,500 | 3,500 | 3,500 | 3,500 | 3,500 | 3,500 | 3,500 | 3,500 | 3,500 | 3,500 | 3,500 |
| $H_2/CO$ molar ratio | 1.2 | 1.2 | 1.2 | 1.2 | 0.25 | 4.0 | 1.2 | 1.2 | 1.2 | 1.2 | 1.2 | 1.2 | 1.2 | 1.2 | 1.2 |
| Residence time, minutes | 240 | 240 | 240 | 240 | 240 | 240 | 60 | 120 | 240 | 240 | 240 | 240 | 240 | 240 | 240 |
| Solvent/olefin weight percent ratio | 0.54 | 0.54 | 0.54 | 0.54 | 5.3 | 5.3 | 0.54 | 0.54 | 0.54 | 0.54 | 0.54 | 0.54 | 0.54 | 0.54 | 0.54 |
| $Mo(CO)_5(PBu_3)$, grams | 8.8 | 8.8 | 8.8 | 8.8 | 8.8 | 8.8 | 8.8 | 8.8 | 17.6 | 4.4 | 8.8 | 8.8 | 8.8 | 8.8 | 8.8 |
| $HCo(CO)_4$, grams | 0.13 | 0.13 | 0.13 | 0.13 | 0.13 | 0.13 | 0.13 | 0.13 | 0.13 | 0.13 | 0.26 | 0.06 | 0.13 | 0.13 | 0.13 |
| Tri-n-hexyl amine, grams | (1) | (1) | (1) | (1) | (1) | (1) | (1) | (1) | (1) | (1) | (1) | (1) | 17.2 | 8.6 | 4.3 |
| 1-hexene, grams | 134 | 134 | 134 | 134 | 34 | 34 | 134 | 134 | 134 | 134 | 134 | 134 | 134 | 134 | 135 |
| n-Decane, grams | 73 | 73 | 73 | 73 | 181 | 181 | 73 | 73 | 73 | 73 | 73 | 73 | 73 | 73 | 73 |
| Total linear product, mol percent | 71 | 78 | 79 | 75 | 69 | 79 | 81 | 82 | 80 | 71 | 76 | 78 | 78 | 78 | 78 |
| Linear alcohol, mol percent | 60 | 52 | 36 | 51 | 39 | 61 | 25 | 39 | 48 | 56 | 62 | 38 | 49 | 51 | 54 |
| Linear aldehyde, mol percent | 1.0 | 17 | 33 | 15 | 24 | 3 | 47 | 34 | 21 | 8 | 5 | 30 | 22 | 21 | 18 |
| Olefin conversion, mol percent | 100 | 92 | 76 | 83 | 87 | 99 | 55 | 74 | 83 | 99 | 99 | 72 | 89 | 89 | 93 |

TABLE III

| Run Number | 41 | 42 | 43 | 44 | 45 | 46 | 47 | 48 | 49 | 50 | 51 |
|---|---|---|---|---|---|---|---|---|---|---|---|
| Temperature, ° F | 455 | 400 | 383 | 400 | 400 | 400 | 400 | 400 | 400 | 400 | 400 |
| Pressure, p.s.i.g | 3,500 | 3,500 | 3,500 | 2,000 | 500 | 3,500 | 3,500 | 3,500 | 3,500 | 3,500 | 3,500 |
| $H_2/CO$ molar ratio | 1.2 | 1.2 | 1.2 | 1.2 | 1.2 | 1.2 | 1.2 | 1.2 | 1.2 | 1.2 | 1.2 |
| Residence Time, minutes | 240 | 240 | 240 | 240 | 240 | 120 | 60 | 240 | 240 | 240 | 240 |
| Solvent/olefin weight percent ratio | 0.54 | 0.54 | 0.54 | 0.54 | 0.54 | 0.54 | 0.54 | 0.54 | 0.54 | 0.54 | 0.54 |
| $W(CO)_5(PBu_3)$, grams | 10.5 | 10.5 | 10.5 | 10.5 | 10.5 | 10.5 | 10.5 | 21.0 | 5.3 | 10.5 | 10.5 |
| $HCo(CO)_4$, grams | 0.13 | 0.13 | 0.13 | 0.13 | 0.13 | 0.13 | 0.13 | 0.13 | 0.13 | 0.26 | 0.06 |
| Tri-n-hexyl amine, grams | None | None | None | None | None | None | None | None | None | None | None |
| 1-Hexene, grams | 134 | 134 | 134 | 134 | 134 | 134 | 134 | 134 | 134 | 134 | 134 |
| n-Decane, grams | 73 | 73 | 73 | 73 | 73 | 73 | 73 | 73 | 73 | 73 | 73 |
| Total linear product, mol percent | 75 | 82 | 84 | 82 | 75 | 84 | 85 | 85 | 76 | 81 | 82 |
| Linear alcohol, mol percent | 63 | 50 | 42 | 57 | 49 | 38 | 23 | 56 | 48 | 64 | 38 |
| Linear aldehyde, mol percent | 0.4 | 19 | 35 | 14 | 11 | 33 | 47 | 16 | 18 | 6 | 29 |
| Olefin conversion, mol percent | 100 | 78 | 81 | 75 | 34 | 62 | 40 | 73 | 89 | 91 | 66 |

The above clearly illustrates the operation of the process defined and claimed herein. Thus, an increase in temperature increases olefin conversion and total alcohol production but decreases somewhat linear product formation. As the pressure is decreased olefin conversion and linear product formation are reduced. Alcohol formation appears to maximize at about 1000 pounds per square inch gauge. An increase in hydrogen to carbon monoxide ratio increases olefin conversion and linear product formation. An increase in residence time increases olefin conversion and alcohol formation and insignificantly affects linear product formation. Increasing the solvent to olefin ratio does not contribute significantly to olefin conversion or linear product formation. As the amount of major catalyst component increases total linear product formation increases and olefin conversion decreases. With no major catalyst, in fact 100 percent olefin conversion can be obtained. As the amount of cocatalyst increases olefin conversion increases and selectivity to linear product very slightly decreases.

Obviously many modifications and variations of the invention, as hereinabove set forth, can be made without departing from the spirit and scope thereof, and therefore only such limitations should be imposed as are indicated in the appended claims.

I claim:

1. In the process wherein an alkene is reacted with hydrogen and carbon monoxide at elevated temperatures and elevated pressures to obtain a product predominating in a compound selected from the group consisting of an aldehyde and an alcohol having one carbon more than said alkene, the improvement which comprises carrying out reaction in the presence of a catalyst system containing a major amount of a Group VI–B metal carbonyl complexed with a compound of an element selected from the group consisting of trivalent phosphorus, trivalent arsenic and trivalent antimony and a minor portion of a metal hydro carbonyl wherein said metal is selected from the group consisting of cobalt, rhodium, iridium, palladium, iron, nickel, ruthenium, osmium, manganese and rhenium at a temperature within the range of about 350° to about 500° F. and a pressure within the range of about 500 to about 5000 pounds per square inch gauge.

2. The process of claim 1 wherein the group VI–B metal is chromium.

3. The process of claim 1 wherein the Group VI–B metal is molybdenum.

4. The process of claim 1 wherein the Group VI–B metal is tungsten.

5. The process of claim 1 wherein said element is trivalent phosphorus.

6. The process of claim 1 wherein said element is trivalent arsenic.

7. The process of claim 1 wherein said element is trivalent antimony.

8. The process of claim 1 wherein said metal in said metal hydride is cobalt.

9. The process of claim 1 wherein the major portion of the catalyst relative to the charge is from about 0.5 to about 15 percent by weight.

10. The process of claim 1 wherein the minor portion of the catalyst relative to the charge is from about 0.01 to about three percent by weight.

11. The process of claim 1 wherein the reaction is carried additionally in the presence of a trialkyl amine wherein the alkyl substituent is composed solely of carbon and hydrogen atoms.

12. The process of claim 1 wherein the reaction is carried out additionally in the presence of tri-n-hexyl amine.

13. The process of claim 1 wherein the alkene is propylene.

14. The process of claim 1 wherein the alkene is hexene-1.

15. The process of claim 1 wherein the major amount of the catalyst system is tributylphosphine chromium pentacarbonyl and the minor amount is cobalt hydrocarbonyl.

16. The process of claim 1 wherein the major amount of the catalyst system is tributylphosphine molybdenum pentacarbonyl and the minor amout is cobalt hydrocarbonyl.

17. The process of claim 1 wherein the major amount of the catalyst system is tributylphosphine tungsten pentacarbonyl and the minor amount is cobalt hydrocarbonyl.

References Cited

FOREIGN PATENTS 992,136 5/1965 Great Britain -------- 260—604

OTHER REFERENCES

Graham et al., Inorganic Chem., vol. 6, pages 2082–2085, 1967.

Roos et al., Journal of Organic Chem. vol. 31, pages 3015–3017, 1966.

Werner et al., Chem. Ber., vol. 99, pages 3582–3592, 1966.

LEON ZITVER, Primary Examiner

R. H. LILES, Assistant Examiner

U.S. Cl. X.R.

252—431 P; 260—598 R, 632 HF, 598, 617 HF

PO-1050
(5/69)

UNITED STATES PATENT OFFICE
CERTIFICATE OF CORRECTION

Patent No. 3,631,111 Dated December 28, 1971

Inventor(s) Edmond R. Tucci

It is certified that error appears in the above-identified patent and that said Letters Patent are hereby corrected as shown below:

Column 1, lines 42 and 43, please cancel "reaction temperature can be appreciably increased and the".

Column 1, line 52, please insert a comma (,) after "ruthenium".

Column 1, line 71, cancel "oxy" and insert "from one to eight carbon atoms, such as methoxy, ethoxy,".

Column 2, the second formula should read as follows:

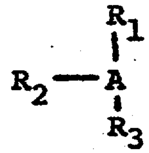

Column 3, line 64, please cancel the parenthesis after "carbonyl".

Column 5, line 75, "catalyst" should read "catalysts".

Column 6, Table I, third line under Run No. 2, please change "12." to "1.2".

Column 6, line 6, under Run No. 3, "7." should read "7.9".

Signed and sealed this 23rd day of May 1972.

(SEAL)
Attest:

EDWARD M.FLETCHER,JR.
Attesting Officer

ROBERT GOTTSCHALK
Commissioner of Patents